F. W. ROLLER.
ELECTRICAL MEASURING INSTRUMENT.
APPLICATION FILED SEPT. 13, 1906.

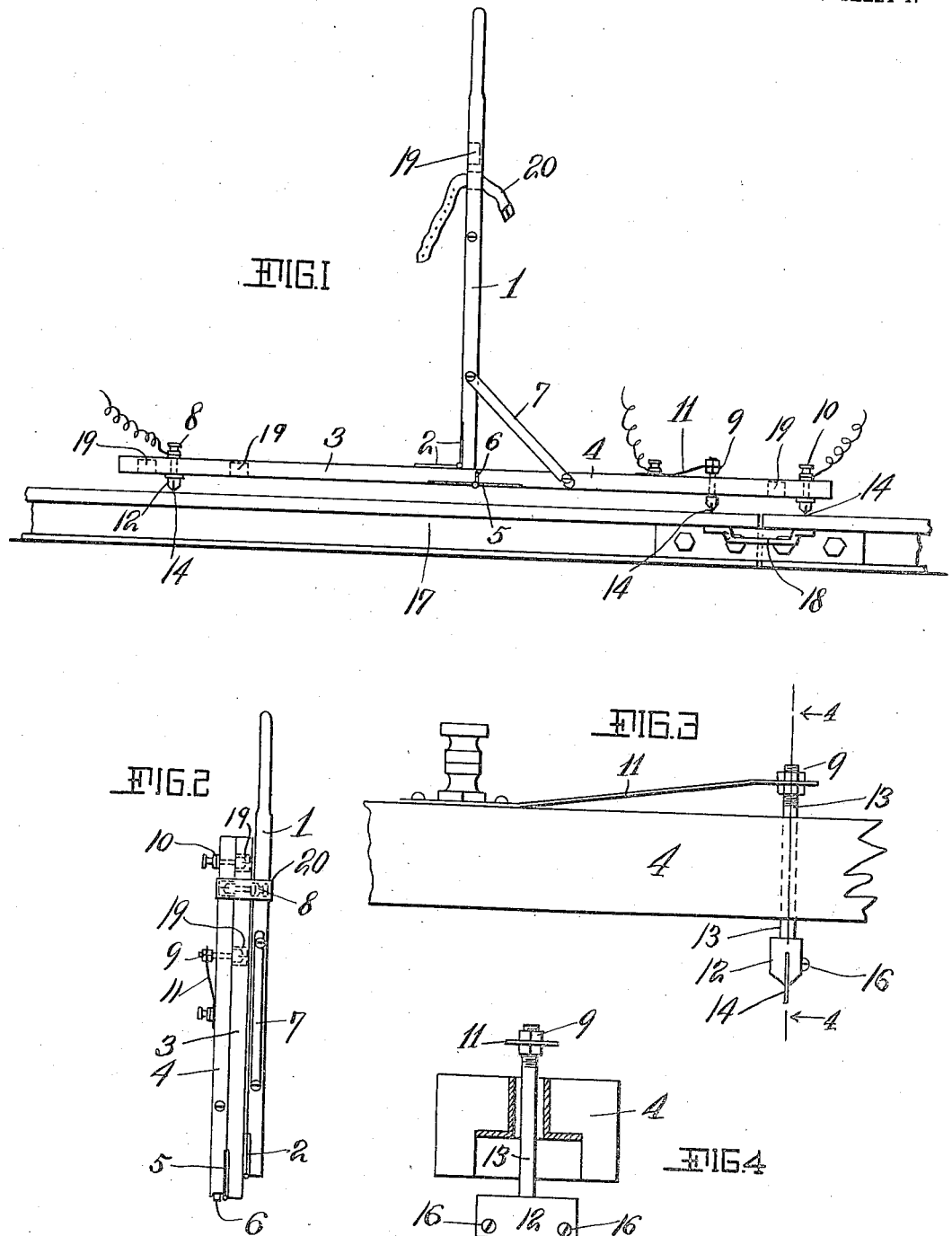

958,320.

Patented May 17, 1910.
2 SHEETS—SHEET 2.

Witnesses
L. K. Sager.
Geo. N. Kerr.

Frank W. Roller   Inventor
By his Attorney
C. W. Edwards

UNITED STATES PATENT OFFICE.

FRANK W. ROLLER, OF EAST ORANGE, NEW JERSEY, ASSIGNOR TO ROLLER-SMITH COMPANY, A CORPORATION OF NEW YORK.

ELECTRICAL MEASURING INSTRUMENT.

958,320.  Specification of Letters Patent.  Patented May 17, 1910.

Application filed September 13, 1906. Serial No. 334,402.

*To all whom it may concern:*

Be it known that I, FRANK W. ROLLER, a citizen of the United States, residing at East Orange, in the county of Essex and State of New Jersey, have invented certain new and useful Improvements in Electrical Measuring Instruments, of which the following is a full, clear, and exact specification.

My invention relates to electrical measuring instruments, and is particularly adapted for the determination or measurement of electrical resistance, and has a special application to testing bonds in railway systems.

By my invention a simple and compact apparatus is provided having a high degree of accuracy and which may be conveniently and quickly manipulated and in which the parts are readily accessible for inspection, repair or renewal.

One of the important features of my invention is the arrangement and form of contacts for the contact bar. In testing bonds of rails, it has been particularly difficult to maintain the contacts in a condition that will give accurate and uniform readings. This is due to the great hardness of the rails and to the necessity of scraping or scratching their surface to obtain good contact. This quickly wears away the contacts which must afterward be sharpened or the whole terminal connection replaced to insure accuracy. By my invention, however, the form of contact is such that the durability is very much extended, better contact is secured and the contacting portion is very easily and cheaply renewed without disassembling any other part and the contact is further of a form that is readily available from supplies ordinarily present in railway work.

This and other features of my invention will be understood from the following description and accompanying drawings, and the novelty thereof will be more particularly set forth in the claims.

Figure 6:
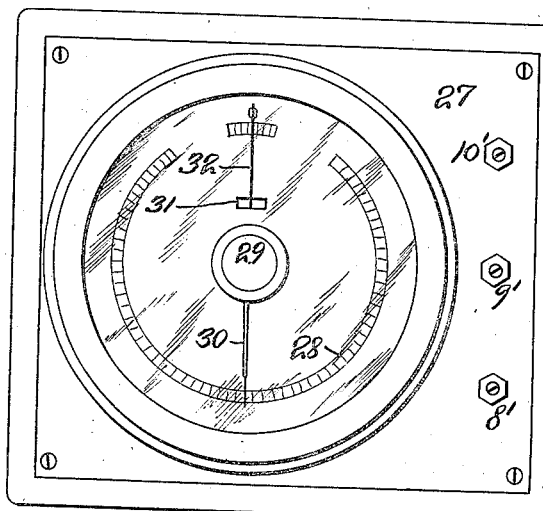
Figure 7:
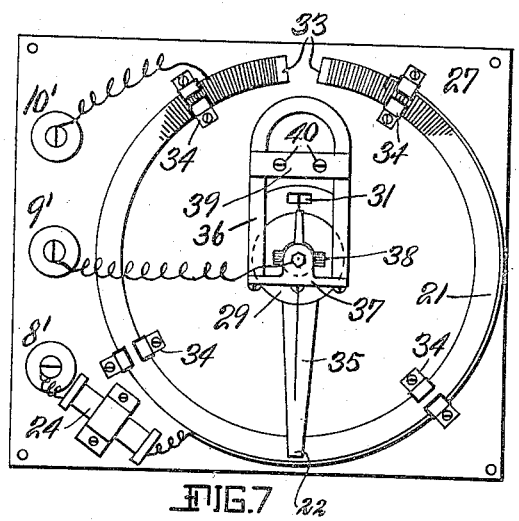
Figure 9:
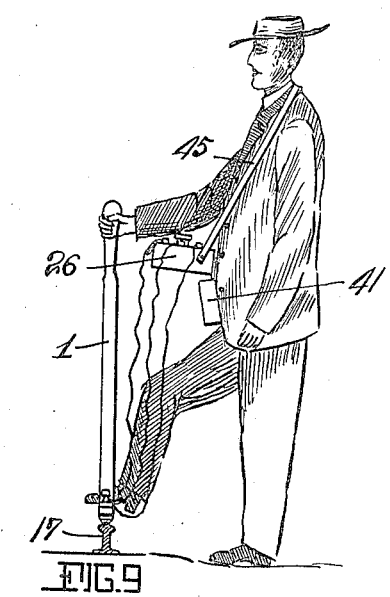
Figure 8:
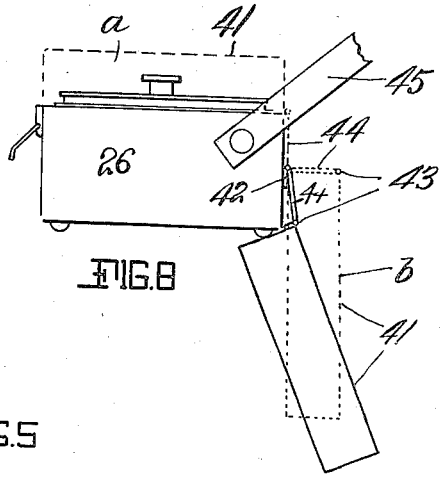
Figure 5:
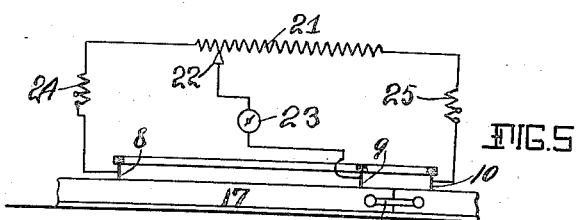

Figure 1 is a side view of the contact bar and parts in position upon a rail; Fig. 2 is a side view of the contact bar folded; Fig. 3 is a side view of a section of the contact bar; Fig. 4 is a sectional view on the line 4—4 of Fig. 3; Fig. 5 is a diagram of electrical connections; Fig. 6 is a plan view of the case of the indicating instrument; Fig. 7 is a plan view of the underside of the removable plate of the instrument; Fig. 8 is a side view of an indicating instrument showing the pivotal arrangement of the cover; and Fig. 9 is a view showing the use of the apparatus by an operator.

Referring to Figs. 1 to 4, which show the construction of the contact bar, a handle 1 is hinged at 2 to a bar consisting of the parts 3, 4. The handle 1 is hinged to the part 3 at one end as shown, and the part 4 is hinged to the part 3 at the same end by the hinge 5. In the joint between the bars 3, 4 is inserted a spring 6 which tends to turn the bar 4 on the hinge 5 and give yieldability to the bar so that in raising and lowering the handle, the contacts will engage the conductor to be tested and scratch the surface to secure good electrical contact. It may sometimes be desirable to more rigidly connect the parts in case the surfaces are comparatively clean and for this purpose I provide a slotted strip 7, adapted to connect the arm 1 and part 4 when desired.

The contact bar carries three terminals and contacts 8, 9, 10 of similar construction, the middle one however being yieldable to insure the engagement of all three contacts with the conductor. The middle terminal and contact 9 is shown as carried by a spring 11, which is fixed at one end to the part 4 of the bar, and the part carrying the contact portion passes freely through the bar as shown in Fig. 4 to permit such movement as may take place.

The terminals and contacts each comprise a holding block 12 having a rod 13 extending therefrom and through the contact bar, the upper end being threaded to receive suitable nuts for connecting the terminal wires from the indicating instrument, or in the case of the middle contact for connecting the spring 11, the opposite end of the latter being shown with a terminal connection. The contacts 8, 10 are firmly fixed to the ends of the contact bar as shown. The contact blocks or jaws 12 are of such form and so fixed in place as to extend cross wise to the contact bar or hold the contact crosswise to the bar and may be each provided with a slot which extends cross wise to the bar. The slot is adapted to receive a metal blade 14 having a serrated edge 15, and this contact portion is held in place in the block by the screws 16. The most desirable and also the most easily obtained material for this contact portion 14 is a section of an ordinary hack-saw blade, commonly used in cutting rails and other metal parts. Such a blade being of hardened steel has all the desirable qualities for the contact portion, such as toughness, suitable form of edge to insure good contact and is easily obtained.

It is apparent that the contact portion 14 may be simply and easily removed by loosening the screws 16 and a part of the hack-saw blade to form the new contact may be readily broken off after one end of the blade is clamped in place. The large number of teeth on the contact portion 14 will, of course, resist wear and secure better electrical contact than a contact having a single point, and the serrated blade being at right angles to the rail or other conductor, definite lengths or sections of the conductor will always be measured or compared. Also by reason of being at right angles to the contact bar and rail, the serrated contacts will very effectively scratch and dig into the surface of the rail when the bar is moved for the purpose of securing good electrical contact.

In Fig. 1, the contact bar is shown applied to a rail section 17 having a joint or bond 18 which is to be tested. The contact bar is so placed that the contacts 9, 10 bridge the joint to be measured, while the contacts 8, 9 include between them a standard section of rail.

Fig. 2 shows the contact bar folded together for convenient carrying when not in use. Pockets 19 are formed in the different parts to receive and protect the contacts when folded and a strap 20 is carried by the handle 1 and adapted to hold the parts together.

In Fig. 5 a diagram shows the electrical connections of the parts. The two outside terminals 8, 10 of the contact bar are shown connected to the terminals of a resistance 21, and a movable contact 22 is arranged to transfer portions of resistance 21 to one or the other branches of the electric circuit connecting parts 8, 10. From contact 22 a connection is made to contact 9 through a galvanometer 23. It will be seen that when the resistance 21 is divided by the position of contact 22 so that the divided parts of resistance 21 are in the ratio of the standard rail section between contacts 8, 9 to the bond section between contacts 9, 10, then any flow of current through the conducting rails will cause no deflection of the galvanometer. Consequently, the adjustment of contact 22 to a position in which no deflection of the galvanometer takes place, necessarily brings the ratio of the resistance 21 the same as the ratio of the standard length of rail and the joint or bond. Hence, a scale traversed by an index secured to contact 22 will indicate the relative resistance of the joint to the standard length of rail with which it is compared, and the scale may be graduated to indicate this ratio directly or may be graduated to indicate directly the resistance of the joint in length of the standard rail, that is, may indicate length in feet of standard rail to which the resistance of the joint is equal. This latter graduation has proved desirable in practice.

If desired, I may have resistance 21 the only resistance in the connection from contact 8 to contact 10, and the indications on the scale will then have a range from zero to infinity; but by inserting resistances 24, 25 of proper amount in this connection, the limits of the scale may be confined to any range desired to suit the conditions or requirements of any particular application.

The resistances, galvanometer and indicating parts are preferably contained in a box 26. In the top portion of the box is fitted a wooden plate 27 which carries the terminals 8′, 9′, 10′ from the resistance 21 and galvanometer 23 for connection to the three terminals of the contact bar. The plate 27 also carries on its face a circular indicating scale 28 graduated as above referred to for indicating the resistance or relative resistance of the bond tested. The central button 29 by turning is adapted to adjust the division of resistance 21 and a pointer 30 attached to the button passes over the scale. An opening 31 in the face plate has projecting through it a needle 32 which is attached to the movable part of the galvanometer and no deflection of the needle to either side will show that the resistances are balanced when a reading of the indicator may be taken.

On the under side of the plate 27, is mounted the resistance 21 formed by winding a wire on a grooved cylinder 33 of vulcanized rubber or other insulating material, which is afterward bent in the form of a circle as shown in Fig. 7 and secured in place on plate 27 by clamps 34. To the button 29 is fixed an arm 35, the end of which contacts with the resistance 21 and by turning the button, the resistance 21 will be divided in any proportion desired to secure a balance of the galvanometer.

The galvanometer 23 may be of any suitable form and is shown in Fig. 7 as comprising a permanent magnet 36, having a non-magnetic bridge piece 37 for supporting the movable coil 38. This movable coil carries the needle 32 which is visible at the face of the instrument. The coil 38 of the galvanometer is connected electrically with the arm 35 and with terminal 9′. This galvanometer is mounted as a whole upon the under side of the plate 27 and within the circular resistance 22, being held in place in any suitable manner, such as by the clamps 39 and screws 40. In the instrument shown, a fixed resistance 24 is indicated as secured to the under side of plate 27 and connected to the end of resistance 21 with which the terminal 8 is connected. This limits the range of the scale to the measurement of a specific maximum which the resistance of the bond would rarely exceed.

The instrument box is preferably provided with a cover 41 which is hinged in a peculiar manner. This hinge comprises a fixed part 42 on the box, a fixed part 43 on the cover and an intermediate link or plate 44 which is pivotally connected to the other two parts. The length of the link 44 is approximately equal to the depth of the cover 41 and this length of the link or depth of the cover is approximately equal to one-half of the depth of the box 26. The point at which the pivotal connection of link 44 and part 42 is located on the side of box 26 is approximately midway between the top and bottom. With this construction, the cover may be closed as indicated at $a$ in dotted lines in Fig. 8; may be opened to the position indicated in full lines in Fig. 8, the rear side of the cover coming under the bottom of the box; and the cover may be placed in the position indicated in dotted lines at $b$, the rear side of the cover coming under the hinge and the cover being in a substantially vertical position and to one side of the box. A strap 45 is secured to the rear part of the box at the sides and is adapted to pass over the shoulders of the operator as shown in Fig. 9. In this figure the cover 41 is shown in the same position as in full lines in Fig. 8, and it will be seen that the arrangement secures perfect stability of the instrument without any other support. This stability is secured by the function of the cover, the inside face of which comes against the body of the operator and so steadies and aids in the support of the instrument box. If it be found more convenient for the operator to read the instrument when it is not so close to him, the cover may be placed in the dotted position $b$, Fig. 8. The cover will then steady and aid in supporting the instrument but the instrument will be in a new position farther in front of the operator. The instrument may therefore be adjusted in position by means of the cover to suit the convenience of the operator.

It will be understood in using the apparatus, that after good contact is made with the rail to be tested and which carries current, the button 29 will be turned to adjust the resistance 21 until no deflection of the galvanometer takes places. The pointer 30 will then indicate on the scale the resistance or relative resistance of the bond or other part tested.

It will be understood that, although I have described and shown one form of apparatus, various modifications may be made therein without departing from the scope of the appended claims.

Having thus described my invention, I declare that what I claim as new and desire to secure by Letters Patent, is,—

1. In a bond testing device, the combination of a contact bar, means whereby said bar may be moved by the operator, a plurality of saw-blade contacts, and a plurality of clamping jaws on the opposite side of the bar from said means for removably holding said saw-blade contacts in position respectively.

2. A resistance measuring instrument comprising in combination, a box, a removable plate, said plate having secured on one side an adjustable resistance in circular form, means mounted in said plate for adjusting said resistance and extending through to the opposite side of said plate, a galvanometer mounted within said circular resistance, and means for indicating the resistance and for indicating the movement of the galvanometer on the said opposite side of said plate.

3. A measuring instrument comprising in combination a plate, an adjustable resistance in circular form secured to the lower side of said plate, a centrally mounted means for adjusting the resistance extending through to the upper side of said plate, a galvanometer mounted within said circular resistance, and means for indicating the resistance and for indicating the movement of the galvanometer on the upper side of said plate.

4. A resistance measuring instrument for bond testing comprising in combination a plate, an adjustable resistance in circular form secured to one side of said plate, a centrally mounted means for adjusting the resistance extending through to the opposite side of said plate, a galvanometer mounted within said circular resistance, and means for indicating the resistance and for indicating the movement of the galvanometer on the said opposite side of said plate.

5. A bond testing instrument comprising a box inclosing the instrument, a cover for the box, a hinge for said cover, said hinge having an intermediate length equal to approximately one-half the depth of said box, and a strap for supporting the box.

6. A bond testing instrument comprising a box inclosing the instrument, a cover for the box, means connecting said cover and box for holding the cover in place and for also supporting the cover in a substantially vertical plane and extending below said box, and means for supporting the box from the operator.

7. A bond testing instrument comprising a box inclosing the instrument, a cover for the box, means connecting said cover and box for holding the cover in place and for also supporting the cover in a substantially vertical plane and either below said box or to one side of it, and means for supporting the box from the operator.

8. A resistance measuring instrument for bond testing comprising in combination a removable plate, an adjustable resistance in circular form secured to one side of said plate, a centrally mounted means for adjusting the resistance extending through to the opposite side of said plate, and a galvanometer mounted within said circular resistance.

9. A resistance measuring instrument for bond testing comprising in combination a box, a removable plate, said plate having an adjustable resistance in circular form secured to one side, a centrally mounted means for adjusting the resistance extending through to the opposite side of said plate, a galvanometer mounted within said circular resistance, and means for indicating the resistance and for indicating the movement of the galvanometer on the said opposite side of said plate.

In testimony whereof I affix my signature, in presence of two witnesses.

FRANK W. ROLLER.

Witnesses:
L. K. SAGER,
GEO. N. KERR.